Patented Oct. 27, 1953

2,657,199

UNITED STATES PATENT OFFICE 2,657,199

INTERPOLYMERS OF A DIFLUORODICHLOROETHYLENE, A 1,3-BUTADIENE HYDROCARBON AND VINYLIDENE CHLORIDE

Vernon L. Folt and Earl J. Carlson, Akron, Ohio, assignors to The B. F. Goodrich Company, New York, N. Y., a corporation of New York No Drawing. Application June 3, 1952, Serial No. 291,579

6 Claims. (Cl. 260—80.7)

This invention relates to novel polymeric materials and relates particularly to interpolymers of a difluorodichloroethylene, a 1,3-butadiene hydrocarbon and vinylidene chloride, and the preparation thereof.

It is well known that many high-molecular weight thermoplastic materials such as polyvinyl chloride must ordinarily be mixed with a plasticizer in order to form useful flexible products therefrom. It is also known that such mechanical mixtures have several undesirable characteristics. For example, plasticizers such as the organic esters, tend to migrate, absorb foreign materials which often discolor the composition, and they may be leached out of the plastic composition under certain service conditions. Therefore it is an object of this invention to prepare polymeric materials of a plastic nature that may be used as such in preparing flexible products, thus eliminating the undesirable effects accompanying use of plasticizers. Other objects will appear hereinafter.

We have now discovered that these objects are attained in a new and useful class of high-molecular weight thermoplastic materials which are interpolymers of (1) a difluorodichloroethylene, preferably 1,1-difluoro-2,2-dichloroethylene, (2) a 1,3-butadiene hydrocarbon, preferably 1,3-butadiene itself, and (3) vinylidene chloride.

In preparing the interpolymers of this invention a monomeric mixture composed of from 35 to 55 mol percent of the difluorodichloroethylene, 25 to 45 mol percent of the 1,3-butadiene hydrocarbon and 10 to 35 mol percent of vinylidene chloride is polymerized by any of the free radical techniques known to and utilized by those skilled in the art. The resulting polymer is freed of the reaction media and dried. The solid interpolymers so obtained are high-molecular weight plastics which are tough, clear, flexible, flame resistant, and quite unexpectedly have very low permanent set values. They become cloudy on stretching but exhibit rapid recovery and clarity immediately after rupture. The interpolymers of this invention have a wide variety of physical properties ranging from soft flexible materials to stiff leatherlike materials. They contain from 20 to 50 mol percent bound difluorodichloroethylene.

The preferred interpolymers of this invention are those prepared by polymerizing a three-component monomer mixture containing from 37.5 to 50 mol percent 1,1-difluoro-2,2-dichloroethylene, 20 to 32.5 mol percent vinylidene chloride and about 30 mol percent 1,3-butadiene. Within this range we have found, quite unexpectedly, that small variations in the monomer feed ratio of the difluorodichloroethylene and vinylidene chloride result in large differences in degree in physical properties of the resulting interpolymers. For example, by polymerizing in aqueous emulsion a monomer mixture of 30 mol percent 1,3-butadiene, 50 mol percent 1,1-difluoro-2,2-dichloroethylene and 20 mol percent vinylidene chloride, we are able to prepare a plastic interpolymer resembling in its stress-strain characteristics a high-molecular weight polyethylene plastic. We are also able to prepare by means of the emulsion polymerization of a monomer mixture of 30 mol percent 1,3-butadiene, 37.5 mol percent 1,1-difluoro-2,2-dichloroethylene and 32.5 mol percent vinylidene chloride, a plastic interpolymer resembling in its stress-strain characteristics a highly plasticized polyvinyl chloride composition.

Preferred embodiments of the invention are illustrated in the following examples in which parts are parts by weight.

Examples 1 through 12

In these examples mixtures of 1,1-difluoro-2,2-dichloroethylene, 1,3-butadiene and vinylidene chloride are polymerized at 50° C. in aqueous emulsion using potassium persulfate as initiator, to form plastic interpolymers by the following general procedure. Into a pressure reaction vessel equipped with means for agitation and temperature control is charged a soap solution consisting of 400 parts of water and 4 parts of a fatty acid soap, 1.2 parts of tertiary dodecyl mercaptan and 0.6 part of potassium persulfate dissolved in a small amount of water. The vessel is flushed well with nitrogen and cooled to about 0° C. 100 parts of a monomeric mixture is charged into the cooled reaction vessel. The reactor is sealed and its contents heated to 50° C. and the reaction allowed to proceed with agitation to the desired degree of conversion of monomer to polymer whereupon the reaction is stopped, either by adding 0.1 part of hydroquinone to the resulting latex or by venting, and emptying the reactor and immediately coagulating the solid polymer by the addition of methanol to the resulting latex.

After coagulation, the solid polymer is washed well with water and dried at about 60° C. The solid interpolymers so obtained are formed into sheets by either milling or molding under heat and pressure. The monomer ratios used, in mole percent, the degree of conversion in percent and the test results for each of the several examples are shown in the following data table:

| Example number | Monomer ratio, mol percent 1,3 butadiene | CF₂CCl₂ | Vinylidene chloride | Reaction time, hours | Conversion, percent | CF₂CCl₂ in polymer, mol percent | Yield¹ point, p. s. i. | Tensile strength, p. s. i. | Elongation, percent | Brittle point, °C. | Permanent set, percent |
|---|---|---|---|---|---|---|---|---|---|---|---|
| 1 | 30 | 37.5 | 32.5 | 10 | 24.2 | 29.06 | 302 | 1,640 | 372 | −15 | |
| 2 | 30 | 37.5 | 32.5 | 24 | 54.7 | 26.64 | 1,778 | 1,888 | 263 | >7.5 | |
| 3 | 30 | 40.0 | 30.0 | 10 | 25.2 | 32.47 | 835 | 2,092 | 385 | +5 | |
| 4 | 30 | 40.0 | 30.0 | 24 | 40.4 | 29.42 | 1,360 | 1,596 | 248 | >7.5 | |
| 5 | 30 | 42.5 | 27.5 | 10 | 27.0 | 33.70 | 952 | 2,532 | 491 | −15 | 7 |
| 6 | 30 | 42.5 | 27.5 | 24 | 42.4 | 31.99 | 2,185 | 2,215 | 218 | 0 | 10 |
| 7 | 30 | 45.0 | 25.0 | 10 | 20.0 | 33.21 | 1,012 | 2,336 | 423 | −5 | 11–15 |
| 8 | 30 | 45.0 | 25.0 | 24 | 48.2 | 33.60 | 2,098 | 2,565 | 320 | >7.5 | 13 |
| 9 | 30 | 47.5 | 22.5 | 10 | 28.4 | 35.44 | 2,294 | 2,325 | 337 | −5 | 13 |
| 10 | 30 | 47.5 | 22.5 | 24 | 45.4 | 35.18 | 2,619 | 2,698 | 322 | >7.5 | 15 |
| 11 | 30 | 50.0 | 20.0 | 10 | 29.7 | 36.78 | 3,164 | 2,300 | 144 | >7.5 | 6–11 |
| 12 | 30 | 50.0 | 20.0 | 24 | 47.3 | 38.20 | 2,914 | 2,294 | 222 | >7.5 | 13–20 |

¹The point in the tension measurement at which there is rapidly increasing elongation with little increase in the load applied.

These examples illustrate very clearly the variety of properties obtained in these interpolymers with only minor variations in the ratio of 1,1-difluoro-2,2-dichloroethylene and vinylidene chloride, and in the degree of conversion. All of the interpolymers of these examples are clear, tough, flexible materials. The interpolymer of Example 4, which has a low yield point, resembles highly plasticized polyvinyl chloride in its properties. The polymer of Example 11 with a high yield point resembles high-molecular weight polyethylene in its properties. Those interpolymers made from monomer mixtures containing more than 45 mol percent 1,1-difluoro-2,2-dichloroethylene generally have two yield points, an upper and a lower point, the upper point being given in the data table above. The tensile strength and yield points may generally be increased by increasing the degree of conversion. The unexpectedly low permanent set values obtained on these plastic materials is well illustrated by Examples 5 and 11.

*Examples 13 through 15*

The effect of variation in the monomer ratio of 1,3-butadiene and 1,1-difluoro-2,2-dichloroethylene is demonstrated in these examples. These polymerizations are conducted at 50° C. in the presence of 2.5 parts by weight of a fatty acid soap, 0.6 part of a tertiary dodecyl mercaptan and 0.3 part of potassium persulfate, in essentially the same manner as is outlined in Examples 1 through 12.

| Example number | Monomer ratio, mol percent 1,3-butadiene | CF₂CCl₂ | Vinylidene chloride | Yield point, p. s. i. | Tensile strength, p. s. i. | Elongation, percent | Elastic modulus, p. s. i. | Appearance |
|---|---|---|---|---|---|---|---|---|
| 13 | 50 | 40 | 10 | 322 | 1,790 | 605 | 1,728 | Slightly rubbery. |
| 14 | 40 | 50 | 10 | 1,654 | 3,432 | 640 | 10,570 | Stiff—leathery. |
| 15 | 30 | 60 | 10 | 3,510 | 3,172 | 519 | 34,300 | Boardy—slightly Flexible. |

It is seen that decreasing the amount of 1,3-butadiene in the monomer feed and increasing correspondingly the 1,1-difluoro-2,2-dichloroethylene content results in interpolymers with higher yield points and ultimate tensile strengths with surprisingly little change in the percent elongation.

Isoprene, dimethylbutadiene and the like may be substituted in part or wholly for 1,3-butadiene in these examples. Although 1,2-difluoro-1,2-dichloroethylene does not copolymerize as readily as the unsymmetrical 1,1-difluoro-2,2-dichloroethylene, it may also be substituted in part or wholly for the latter material in these examples. No special polymerization conditions are required for the preparation of the interpolymers of this invention. The interpolymers may be prepared by any of the techniques known to and used by those skilled in the art such as bulk, solution, suspension and emulsion. Aqueous emulsion or suspension polymerizations are preferred for practical reasons of cost and ease of operation in the preparation of the solid interpolymers. For polymers intended as adhesives and for coatings, solution polymerization may be preferred. The interpolymers may be prepared by batch or continuous processes and advantage may be taken of monomer proportioning techniques.

The polymerization reactions may be initiated by any of the free radical forming initiators ordinarily used, such as the oxygen-containing percompounds represented by potassium persulfate, benzoyl peroxide, cumene hydroperoxide and the like; the catalyst being oil or water soluble, depending upon the nature of the polymerization system employed. The so-called Redox systems consisting of reducing-oxidizing couples may be used, especially at the lower temperatures of polymerization. Reducing agents employed in such systems may be polyamines, sugars, heavy metal complexes and the like, and the oxidizing agents employed may be the initiators listed above as well as hydrogen peroxide, t-butyl hydroperoxide, terpene hydroperoxides and the like. The azo materials such as alpha, alpha'-azodiisobutyronitrile also may be profitably employed as initiators.

The temperature at which the polymerization reaction is conducted may be any desired in the normal ranges ordinarily employed by those skilled in the art such as from 0 to 95° C. For practical purposes the interpolymers are preferably prepared at temperatures from 40 to 60° C.

Emulsifiers for emulsion polymerization systems may be fatty acid, rosin acid or amine soaps; alkyl, aryl, aralkyl sulfonates or sulfates or mixtures thereof and the like. The potassium soaps are preferred for low temperature polymerizations. Concentrations of from 1 to 5 parts by weight of emulsifier per 100 parts of monomer are adequate and are preferred.

For suspension systems, agents like gelatin, casein, clay and polyvinyl alcohol may be used alone or in conjunction with small amounts of a surface-active agent. The amount used will depend upon the type and degree of agitation employed, as is well known; and 0.1 to 0.5 part are usually employed.

The polymerization reactions may be stopped at any desired degree of conversion by the addition of reducing agents such as a hydroquinone, preferably one of the non-discoloring derivatives, or by coagulating the polymer as rapidly as possible. Small amounts, usually about 0.1 part of the reducing agents are employed. The coagulation is effected generally by the addition of solvents such as alcohol, acetone and the like, but the interpolymer may be freed from the reacting media by salt-acid coagulation.

The solvents and diluents utilized in solution polymerization will be determined by the end result desired. If a solution of the interpolymer is desired, an aromatic solvent such as benzene may be used. If it is desired that the interpolymer separate on forming, non-solvents such as butane or hexane may be employed. This selection is well known to those skilled in the art.

Modifying agents usually employed in the free radical polymerization of unsaturated monomers containing an ethylenic double bond, such as sulfur-containing agents represented by the alkyl mercaptans and xanthogen disulfides, are preferably employed. Halogen-containing compounds such as carbon tetrachloride may be utilized. These modifiers may be utilized to control the molecular weight and molecular distribution of the copolymers as well as the degree of branching and cross linking in the polymer chains. The use of a modifying agent seems to be essential to obtain a soluble copolymer for cement applications. About 0.5 to 1.5 parts of modifier are usually employed.

Good quality 1,1-difluoro-2,2-dichloroethylene is preferred for use in preparing these interpolymers. Inert impurities are not objectionable but presence of hydrogen fluoride may interfere with the polymerization reaction rate. The monomer should be protected from long and continued exposure to moisture and air. Polymerization grade 1,3-butadiene and vinylidene chloride, 95 percent or better purity, are preferred but lower purity material may be used.

The interpolymers of this invention may be further modified if desired, by the addition of small amounts of organic plasticizers to the plastic, either in the latex stage or during later processing. Examples of plasticizers useful for such a purpose are the organic esters such as dioctyl phthalate, dioctyl adipate, tricresyl phosphate and the like.

The unique class of plastic materials which are the products of this invention are adapted to a variety of uses. They may be used in molding applications as molded goods, as films, as adhesives, in coating applications and similar uses. They are especially useful in applications where plasticized polymers are used under service conditions where the plasticizer would migrate into surrounding areas or where the plasticizer would be leached out, or other application where a flexible unplasticized polymer is desired.

Accordingly, this invention provides a new and useful class of plastic materials and methods for producing them. It is not intended therefore that the invention be limited except by the spirit and scope of the appended claims.

We claim:

1. A plastic interpolymer prepared by polymerizing a monomeric mixture comprising 25 to 45 mol percent of a 1,3-butadiene hydrocarbon, 35 to 55 mol percent of a difluorodichloroethylene and 10 to 35 mol percent vinylidene chloride.

2. The plastic interpolymer of claim 1 wherein the 1,3-butadiene hydrocarbon is 1,3-butadiene.

3. The plastic interpolymer of claim 1 wherein the difluorodichloroethylene is 1,1-difluoro-2,2-dichloroethylene.

4. A plastic interpolymer prepared by polymerizing a monomeric mixture comprising about 30 mol percent 1,3-butadiene, 35 to 50 mol percent 1,1-difluoro-2,2-dichloroethylene and 20 to 35 mol percent vinylidene chloride.

5. A plastic interpolymer prepared by polymerizing a monomeric mixture of 25 to 45 mol percent of 1,3-butadiene, 35 to 55 mol percent of 1,1-difluoro-2,2-dichloroethylene and 10 to 35 mol percent of vinylidene chloride, said interpolymer comprising 20 to 50 mol percent combined 1,1-difluoro-2,2-dichloroethylene.

6. The method which comprises polymerizing a monomeric mixture containing 25 to 45 mol percent of a 1,3-butadiene hydrocarbon, 35 to 55 mol percent of a difluorodichloroethylene and 10 to 35 mol percent of vinylidene chloride.

VERNON L. FOLT.
EARL J. CARLSON.

References Cited in the file of this patent

UNITED STATES PATENTS

| Number | Name | Date |
| --- | --- | --- |
| 2,584,126 | Hanford | Feb. 5, 1952 |

OTHER REFERENCES

Lowry et al., Ind. & Eng. Chem., vol. 41, No. 1, January 1949, pp. 146–155.